US012608446B2

(12) United States Patent
Niu et al.

(10) Patent No.: US 12,608,446 B2
(45) Date of Patent: Apr. 21, 2026

(54) DETERMINING PERFORMANCE CHANGE WITHIN A DATASET WITH AN APPLIED CONDITION USING MACHINE LEARNING MODELS

(71) Applicant: Capital One Services, LLC, McLean, VA (US)

(72) Inventors: Tong Niu, McLean, VA (US); Abhishek Kumar Shrivastava, McLean, VA (US); Ruoyu Shao, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 1083 days.

(21) Appl. No.: 17/557,599

(22) Filed: Dec. 21, 2021

(65) Prior Publication Data

US 2023/0195841 A1 Jun. 22, 2023

(51) Int. Cl.
| | |
|---|---|
| *G06F 18/21* | (2023.01) |
| *G06F 18/214* | (2023.01) |
| *G06N 20/20* | (2019.01) |

(52) U.S. Cl.
CPC .......... *G06F 18/217* (2023.01); *G06F 18/214* (2023.01); *G06N 20/20* (2019.01)

(58) Field of Classification Search
CPC .......... G06N 20/20; G06N 3/08; G06N 5/01; G06N 7/01; G06N 20/00; G06F 18/217; G06F 18/214
See application file for complete search history.

(56) References Cited

U.S. PATENT DOCUMENTS

| | | | | |
|---|---|---|---|---|
| 2019/0354857 | A1* | 11/2019 | Sallee | G06N 3/09 |
| 2020/0193321 | A1* | 6/2020 | Shao | G06N 20/00 |
| 2021/0224646 | A1* | 7/2021 | Feyerabend | G06N 3/04 |
| 2021/0304069 | A1* | 9/2021 | Tang | G06N 20/00 |
| 2021/0334678 | A1* | 10/2021 | Abelha Ferreira | G06N 20/00 |

OTHER PUBLICATIONS

Rosebrock, "Softmax Classifiers Explained," 2016, https://pyimagesearch.com/2016/09/12/softmax-classifiers-explained/ (Year: 2016).*
Conley et al., "Inference with 'Difference in Differences' with a Small Number of Policy Changes," 2011, https://www.jstor.org/stable/23015923 (Year: 2011).*
Rizve et al., "In Defense of Pseudo-Labeling: An Uncertainty-Aware Pseudo-label Selection Framework for Semi-Supervised Learning," 2021, arXiv:2101.06329v3 (Year: 2021).*

* cited by examiner

*Primary Examiner* — Michael J Huntley
*Assistant Examiner* — Vincent Anton Spraul
(74) *Attorney, Agent, or Firm* — Foley & Lardner LLP

(57) ABSTRACT

Methods and systems are disclosed for determining a performance shift due to an applied condition, excluding other, e.g., environmental, factors. One mechanism for determining a performance shift due to an applied condition involves using two datasets (e.g., a control dataset and a test dataset) for two different populations. A training dataset is used to train a machine learning model to build a control dataset to be used in a second machine learning model together with a test dataset to determine whether a performance shift between the two datasets is due to the condition that was applied to the test dataset.

14 Claims, 6 Drawing Sheets

600

200

| Location | Interest Rate Offered | Loan Amount | Net Worth | Target Variable |
|---|---|---|---|---|
| 202 | 204 | 206 | 208 | 210 |
| Texas | 6.0% | 500,000 | 128,000 | True |
| Texas | 6.0% | 750,000 | 350,000 | False |
| Texas | 6.0% | 425,000 | 55,000 | False |
| Texas | 6.0% | 400,000 | 55,000 | False |
| Texas | 6.0% | 250,000 | 20,000 | False |

| Location | Interest Rate Offered | Loan Amount | Net Worth | Target Variable |
|----------|----------------------|-------------|-----------|-----------------|
| | 302 | 304 | 306 | 308 | 310 |
| California | 3.5% | 500,000 | 128,000 | True |
| California | 3.5% | 750,000 | 350,000 | True |
| California | 3.5% | 425,000 | 55,000 | True |
| California | 3.5% | 400,000 | 55,000 | True |
| California | 3.5% | 250,000 | 20,000 | False |

ML Model 402

406

<u>600</u>

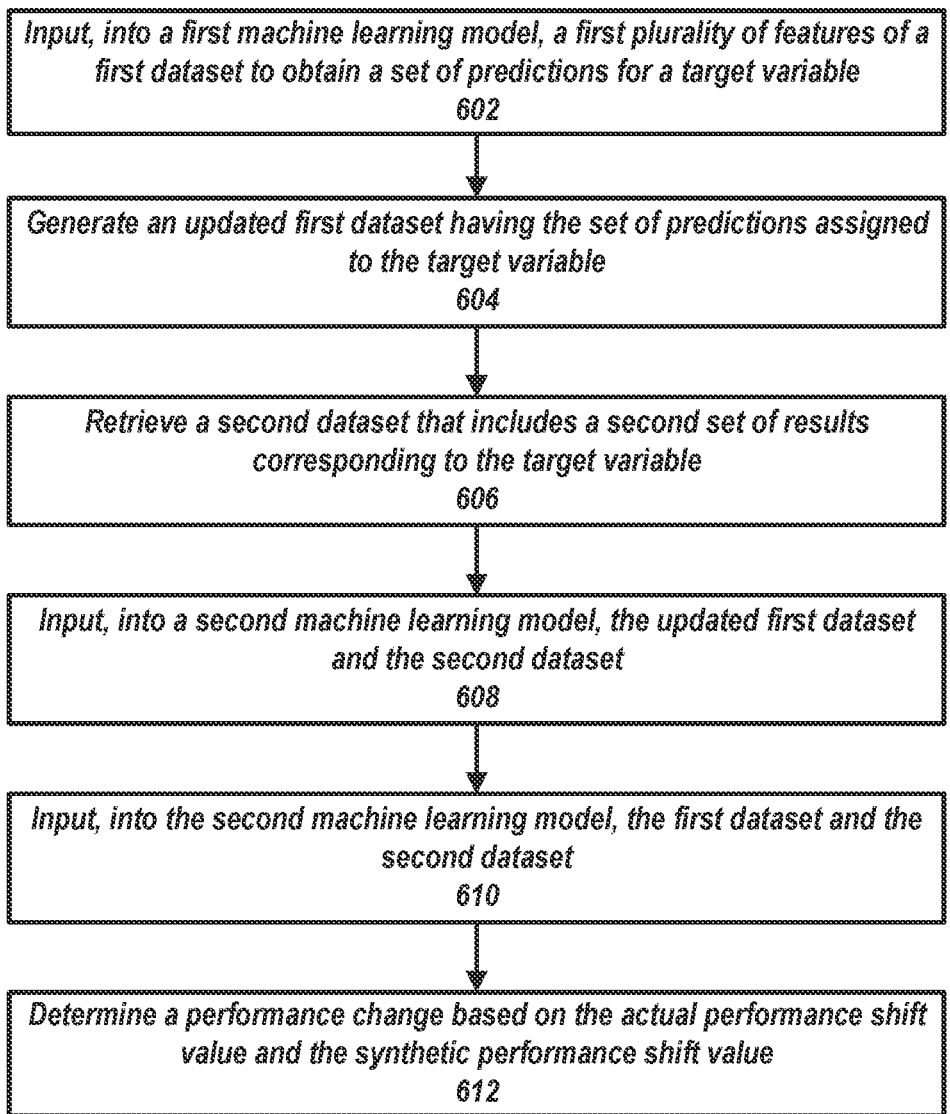

*Input, into a first machine learning model, a first plurality of features of a first dataset to obtain a set of predictions for a target variable*
*602*

*Generate an updated first dataset having the set of predictions assigned to the target variable*
*604*

*Retrieve a second dataset that includes a second set of results corresponding to the target variable*
*606*

*Input, into a second machine learning model, the updated first dataset and the second dataset*
*608*

*Input, into the second machine learning model, the first dataset and the second dataset*
*610*

*Determine a performance change based on the actual performance shift value and the synthetic performance shift value*
*612*

FIG. 6

DETERMINING PERFORMANCE CHANGE WITHIN A DATASET WITH AN APPLIED CONDITION USING MACHINE LEARNING MODELS

BACKGROUND

Recently, use of machine learning technologies has been growing exponentially. Machine learning models are now used in many technology areas including computer vision, network monitoring, autonomous driving, and others. Generally, machine learning models are trained using, for example, a training dataset and then used to make predictions based on that training. One technology area that may benefit greatly from machine learning technologies is prediction of how a certain condition applied to an environment may affect that environment. For example, a school district may want to determine whether adding a snack break in the middle of a school day will improve the students' test scores. To make that determination, the school district may add the snack break and then compare the students' grades before the snack break was introduced with the students' grades after the snack break was introduced. The issue with this approach is that the change in grades may be due not to the introduction of the snack break, but to some other outside factors. That is, the change in grades may be due to environmental factors and not due to an applied condition (the snack break).

SUMMARY

Accordingly, methods and systems are disclosed herein for determining a performance shift due to an applied condition, excluding other, e.g., environmental, factors. One mechanism for determining a performance shift of a population due to an applied condition involves using two datasets for two different populations, training and using a first machine learning model to build a control dataset to be used in a second machine learning model together with a test dataset to determine whether a performance shift between the two datasets is due to the condition was applied to the test dataset. An effect detection system may be used to perform operations for determining a performance shift due to an applied condition.

In some embodiments, the effect detection system may input, into a first machine learning model, a first plurality of features of a first dataset to obtain a set of predictions for a target variable. The first machine learning model may have been trained to output a prediction for the target variable based on features of a training dataset, such that the first plurality of features matches at least some features of the training dataset. In some embodiments, the first dataset may be a base dataset that includes a plurality of predictors corresponding to a first group of individuals and a second group of individuals. The first group may correspond to a first population that includes individuals that share a first characteristic and a second group may correspond to a second population that includes individuals that share a second characteristic.

To continue with the example above, where a school district may want to determine whether adding a snack break in the middle of a school day will improve the students' test scores, the district may select one group of students to be a test group while the other group of students may be a control group. That is, the snack break will be instituted for one group of students and not for the other groups of students. The first dataset may be a set of data that includes students' characteristics, grades and/or other data for students in two different schools (a first population for the first school and a second population for the second school) within the district. Thus, in some embodiments the students may be from two different schools and the data for the training set may be collected, for example, for a semester before the snack break is implemented. The target variable may be one or more grades for each student in the dataset. Thus, the first machine learning model may output a predicted one or more grades (e.g., a grade for each subject) for each student in the dataset.

Effect detection system may then generate an updated first dataset having the set of predictions assigned to the target variable instead of a first set of results. For example, the predicted grades of the students may be added to a new column and that new column may be labelled as the target variable. However, in some embodiments, the predicted grades may replace the actual grades of the students within the dataset (e.g., the results in the column may be replaced with the predictions from the first machine learning model).

The effect detection system may retrieve a second dataset that includes a second set of results corresponding to the target variable. The second set of results may have resulted from applying a condition affecting one or more features of the second dataset. For example, the second dataset may include grades that the students received after the introduction of a snack break.

The effect detection system may input, into a second machine learning model, (1) the updated first dataset including the set of predictions and (2) the second dataset including the second set of results to obtain a synthetic performance shift value between the first dataset and the second dataset. The second machine learning model may be a model that has been trained to output performance change values for two datasets. To continue with the example above, the updated first dataset may include, as the target variable, the predictions from the first machine learning model, while the second dataset may include, as the target variable, the actual grades of the students for whom a snack break was instituted.

The effect detection system may input, into the second machine learning model, the first dataset including the first set of results and the second dataset including the second set of results, to obtain an actual performance shift value between the first dataset and the second dataset. To continue with the example above, the first dataset may include, as the target variable, the students, while the second dataset may include, as the target variable, the actual grades of the students' for the same time semester as the grades for students for whom a snack break was instituted. However, this original first dataset includes data for students for whom the snack break was not instituted (e.g., these students may be from a different school).

The effect detection system may then determine a performance change between the first dataset and the second dataset attributed to the condition based on the actual performance shift value and the synthetic performance shift value. That is the effect detection system may compare the performance difference between the actual performance shift value and the synthetic performance shift value to determine whether the condition (e.g., the snack break) had an effect on the students' grades. In some embodiments, the effect detection system may determine the magnitude of the effect.

Various other aspects, features and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data), unless the context clearly dictates otherwise.

BRIEF DESCRIPTION OF THE DRAWINGS

FIG. 2 illustrates an excerpt from an exemplary control dataset, in accordance with one or more embodiments of this disclosure.

FIG. 3 illustrates an excerpt from an exemplary test dataset, in accordance with one or more embodiments of this disclosure.

FIG. 6 is a flowchart of operations for a mechanism for determining performance changes attributed to conditions affecting datasets, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
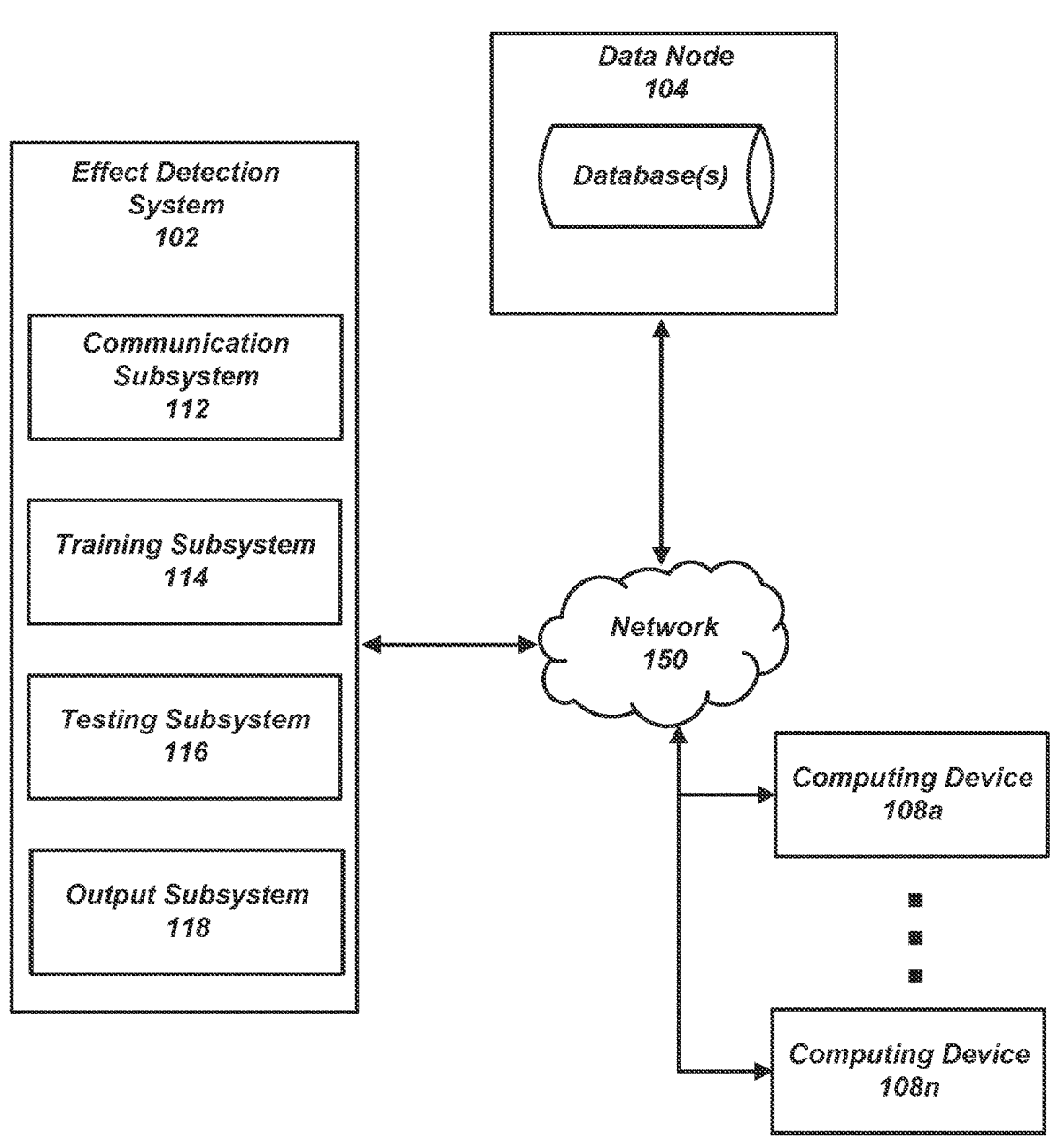
FIG. 1 a system for determining performance changes attributed to conditions affecting datasets, in accordance with one or more embodiments of this disclosure.

FIG. 1 shows environment 100, which includes a system for determining performance changes attributed to conditions affecting datasets. Environment 100 includes effect detection system 102, data node 104, and computing devices 108a-108n. Effect detection system 102 may execute instructions for determining performance changes attributed to conditions affecting datasets, and may include software, hardware or a combination of the two. For example, effect detection system 102 may be a physical server or a virtual server that is running on a physical computer system.

Data node 104 may store various data, including various datasets and other data required for the effect detection system. In some embodiments, data node 104 may store one or more machine learning models, training data and/or various datasets. In some embodiments, data node 104 may also be used to train the machine learning models. Data node 104 may include software, hardware, or a combination of the two. For example, data node 104 may be a physical server, or a virtual server that is running on a physical computer system. Network 150 may be a local area network, a wide area network (e.g., the Internet), or a combination of the two. Computing devices 108a-108n may be end-user computing devices (e.g., desktop computers, laptops, electronic tablets and/or other computing devices used by end users).

Effect detection system 102 may include communication subsystem 112. Communication subsystem 112 may include software components, hardware components, or a combination of both. For example, communication subsystem 112 may include a network card (e.g., a wireless network card and/or a wired network card) that is coupled with software to drive the card. Effect detection system 102 may also include training subsystem 114. Training subsystem 114 may include software components, hardware components, or a combination of both. Training subsystem 114 may perform various training functions for machine learning models.

In addition, effect detection system 102 may also include testing subsystem 116. Testing subsystem 116 may include software components, hardware components, or a combination of both. Testing subsystem 116 may perform various functions for determining performance changes attributed to conditions affecting datasets. Effect detection system 102 may also include output subsystem 118. Output subsystem 118 may include software components, hardware components, or a combination of both. For example, output subsystem 118 may include or may use video components (e.g., a video card) of a computer system and/or other components to provide output of the performance monitoring mechanism.

One mechanism for determining performance changes attributed to conditions affecting datasets is to use a multi-model approach with synthetic control data. Effect detection system 102 may input, into a first machine learning model, a first plurality of features of a first dataset to obtain a set of predictions for a target variable. The first machine learning model may have been trained to output a prediction for the target variable based on features of a training dataset such that the first plurality of features matches at least some features of the training dataset. In some embodiments, the first dataset may be a base dataset that contains a multitude of predictors corresponding to a plurality of characteristics of a first group and of a second group. The first group may correspond to a first population and the second group may correspond to a second population. The first population may have one or more characteristics in common and the second population may share one or more characteristics in common. For example, the first group may be individuals residing in Texas while the second group may be individuals residing in California.

In some embodiments, the first machine learning model may output, based on receiving the first dataset as input, a predicted target variable along with a probability of that target variable being accurate. For example, the first machine learning model may output a Boolean and a probability of the Boolean being correct. In another example, the first machine learning model may output a categorial variable (e.g., a grade for a student) and a probability of that grade being correct.

FIG. 2 illustrates an excerpt from a dataset storing a plurality of features. In particular, FIG. 2 shows table 200 that includes multiple predictors corresponding to a first group of people (e.g., individuals residing in Texas). Column 202 stores a location (e.g., Texas). Column 204 stores one possible predictor that may be used in the process. Column 206 and column 208 may each store other predictors that may be used by the machine learning model. Column 210 may store a target variable. That is, the target variable may be the one that the first machine learning model is predicting. It should be noted that based on the comparison between each prediction and each target variable, the first machine learning model may determine a residual value (e.g., an error value) for each prediction. Although the target variable is illustrated as a Boolean, the target variable may be a categorical variable or a continuous variable.

In one example, the first dataset may be a control dataset (as shown in FIG. 2). The control dataset may include a plurality of variables (features) and a target variable (feature). The control dataset may be a dataset including data for a control group. The control dataset may be associated with one set of individuals that will not be subjected to the condition. For example, if two groups of users are used in the process, the group of individuals residing in Texas may not be subject to the condition while the group of individuals residing in California (FIG. 3) may be subjected to the condition (e.g., if the change in condition is illustrated in changes from column 204 to column 304).

In some embodiments, the first machine learning model may be trained using a training dataset. The training dataset may include one or more features (columns), for example, as shown in FIG. 2 and FIG. 3. Effect detection system 102 may receive a training dataset using communication subsystem 112 from, for example, data node 104 and/or from one of computing devices 108a-108n over network 150. Communication subsystem 112 may pass the data to training subsystem 114. Training subsystem 114 may retrieve the training dataset (e.g., from memory). The training dataset may include a plurality of predictors corresponding to a plurality of characteristics of a first group and/or a second group. The first group may correspond to a first population and the second group may correspond to a second population. Each entry within the first population may share a first characteristic, and each entry within the second population may share a second characteristic. For example, FIG. 2 and FIG. 3 may illustrate portions of the dataset illustrating two different groups and corresponding populations.

Training subsystem 114 may train the first machine learning model using the training dataset to output predictions for the target variable. For example, training subsystem 114 may execute a training algorithm against the machine learning model. The training algorithm may train the machine learning model to output a prediction for a target variable based on the predictors and the existing entries in the target variable (e.g., as illustrated in FIG. 2 and FIG. 3).

In some embodiments, the training dataset may be a similar dataset to datasets illustrated in FIG. 2 and FIG. 3. For example, the training dataset may be data recorded during a specific period (e.g., before a condition is applied). The machine learning model may be trained using that data. After the condition is applied the data may again be collected and two datasets may be generated (e.g., a control dataset where the condition is not applied and a test dataset where the condition is applied).

Figure 4:
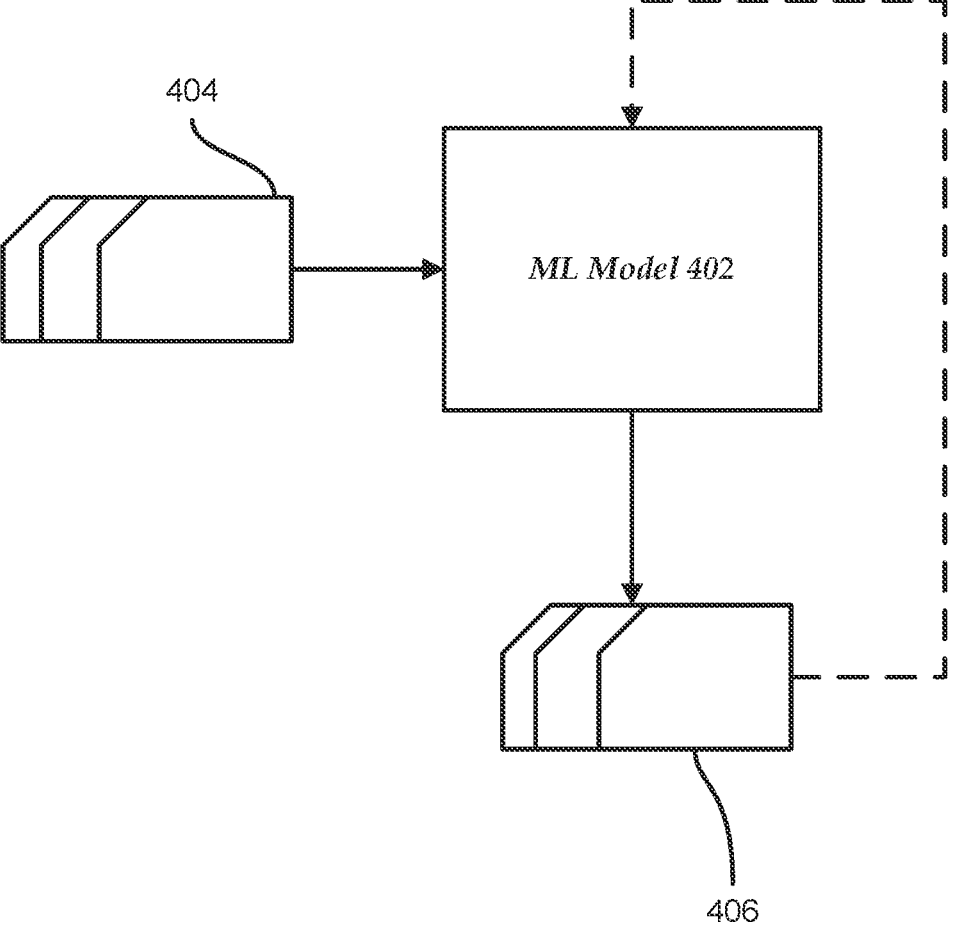
FIG. 4 illustrates an exemplary machine learning model, in accordance with some embodiments of this disclosure.

FIG. 4 illustrates an exemplary machine learning model, in accordance with some embodiments of this disclosure. Machine learning model 402 may take input 404 (e.g., a vector representation of an entry for an individual) and may generate output parameters 406 which may be one or more predictions and/or residuals.

The output parameters 406 may be fed back to the machine learning model as input to train the machine learning model (e.g., alone or in conjunction with user indications of the accuracy of outputs, labels associated with the inputs, or with other reference feedback information). The machine learning model may update its configurations (e.g., weights, biases, or other parameters) based on the assessment of its prediction (e.g., of an information source), and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function which combines the values of all of its inputs together. Each connection (or the neural unit itself) may have a threshold function that a signal must surpass before it propagates to other neural units. The machine learning model may be self-learning and/or trained rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or supervised learning model that can perform classification and/or regression. For example, the machine learning model may be a general purpose supervised learning algorithm that the system uses for both classification and regression tasks. Alternatively, the machine learning model may include a Bayesian model configured to perform variational inference on the graph and/or vector.

The trained machine learning model may be stored and a link for machine learning model may be passed to testing subsystem 116, which may perform the input operation and other operations discussed below. Testing subsystem 116 may generate an updated first dataset having the set of predictions assigned to the target variable instead of a first set of results. In some embodiments, testing subsystem 116 may replace the data labelled as the target variable with the prediction data to generate an updated dataset. In some embodiments, testing subsystem 116 may add another feature (e.g., another column) to the first dataset this other feature including the predictions for the target variable. Testing subsystem 116 may then label the new prediction data as the target variable. In some embodiments, testing subsystem 116 may add a probability for each prediction to the updated dataset. The probability may be later used to determine the residual values for the predictions.

Testing subsystem 116 may retrieve a second dataset that includes a second set of results corresponding to the target variable. The second set of results may have resulted from applying a condition affecting one or more features of the second dataset. To continue with the example above, the second dataset may be a test dataset. That is, the condition may have been applied to that dataset. FIG. 3 illustrates a change shown in column 304 (e.g., from column 204).

FIG. 3 illustrates an excerpt from another dataset storing a plurality of features. In particular, FIG. 3 shows table 300 that includes multiple predictors corresponding to a second group of people (e.g., individuals residing in California). Column 302 stores a location (e.g., California). Column 304 stores one possible predictor that may be used in the process. Column 306 and column 308 may each store other predictors that may be used by the machine learning model. Column 310 may store a target variable. That is, the target variable may be the one that the first machine learning model is predicting. Although the target variable is illustrated as a Boolean, the target variable may be a categorical variable or a continuous variable. It should be noted that each of FIG. 2 and FIG. 3 may include other predictors in addition or instead of illustrated predictors.

To continue with the example above, the second dataset may be a test dataset (as shown in FIG. 3). The test dataset may include a plurality of variables (features) and a target variable (feature). The test dataset may be a dataset including data for a test group. That is, the test dataset may be associated with one set of individuals that will be subjected to the condition. For example, if two groups of users are used in the process, the group of individuals residing in California (FIG. 3) may be subjected to the condition (e.g., if the change in condition is illustrated in changes from column 204 to column 304).

Testing subsystem 116 may input, into a second machine learning model, (1) the updated first dataset including the set of predictions and (2) the second dataset including the second set of results to obtain a synthetic performance shift value between the first dataset and the second dataset. Thus, testing subsystem 116 may input synthetically generated data for the target variable (i.e., target variable data generated by the first machine learning model). The second machine learning model may be a system designed to output performance shift values. Outputting performing shift values is further discussed in U.S. patent application Ser. No. 16/217,808, which is hereby incorporated in its entirety. Furthermore, testing subsystem 116 may input, into the second machine learning model, the first dataset including the first set of results and the second dataset including the second set of results, to obtain an actual performance shift value between the first dataset and the second dataset. Thus, testing subsystem 116 may receive two separate values: the synthetic performance shift value and the actual performance shift value. The actual performance shift value represents a change in performance based on the condition applied and other factors (e.g., environmental factors). Those factors may include factors outside of the experiment. For example, some factors may be economic factors, changes due to nature, or other suitable factors.

Testing subsystem 116 may determine a performance change between the first dataset and the second dataset attributed to the condition based on the actual performance shift value and the synthetic performance shift value. Testing subsystem 116 may calculate a difference between the two values and extrapolate the performance shift due to the condition. In some embodiments, testing subsystem 116 may extrapolate the performance shift due to the condition by generating residual values associated with the synthetic performance shift value and the actual performance shift value.

In some embodiments, testing subsystem 116 may pass the synthetic performance shift value and the actual performance shift value to output subsystem 118. Output subsystem 118 may cause a display of both values and the performance change. Displaying performing shift values is further discussed in U.S. patent application Ser. No. 16/217,808.

In another example, this process may be used to determine whether changing a loan percentage for a population may cause that more cash-out operations. Thus, as exemplified above, in FIG. 2 and FIG. 3 the determination may use two populations of people (e.g., one population from Texas and another population from California). The population from Texas (e.g., FIG. 2) may be used as a control group and population from California (e.g., FIG. 3) may be used as a test group. Data may be collected for both populations before applying the condition (e.g., lowering a loan percentage by a particular number). That data may be used to train a machine learning model (earlier referred to as a first machine learning model) to predict whether a particular individual is likely to perform a cash-out operation (target variable). Then a condition may be applied to one group of individuals (e.g., from California) and data may be collected after a threshold time period for both California individuals (test group) and Texas individuals (control group). As discussed above, an actual performance shift value and a synthetic performance shift value may be collected, and the effect of the condition may be calculated based on the change. That is, the synthetic performance shift value shows a performance shift without a condition and the actual performance shift shows a performance shift with a condition. The difference in those two values show the effect of the condition on performance.

Computing Device Components

Figure 5:
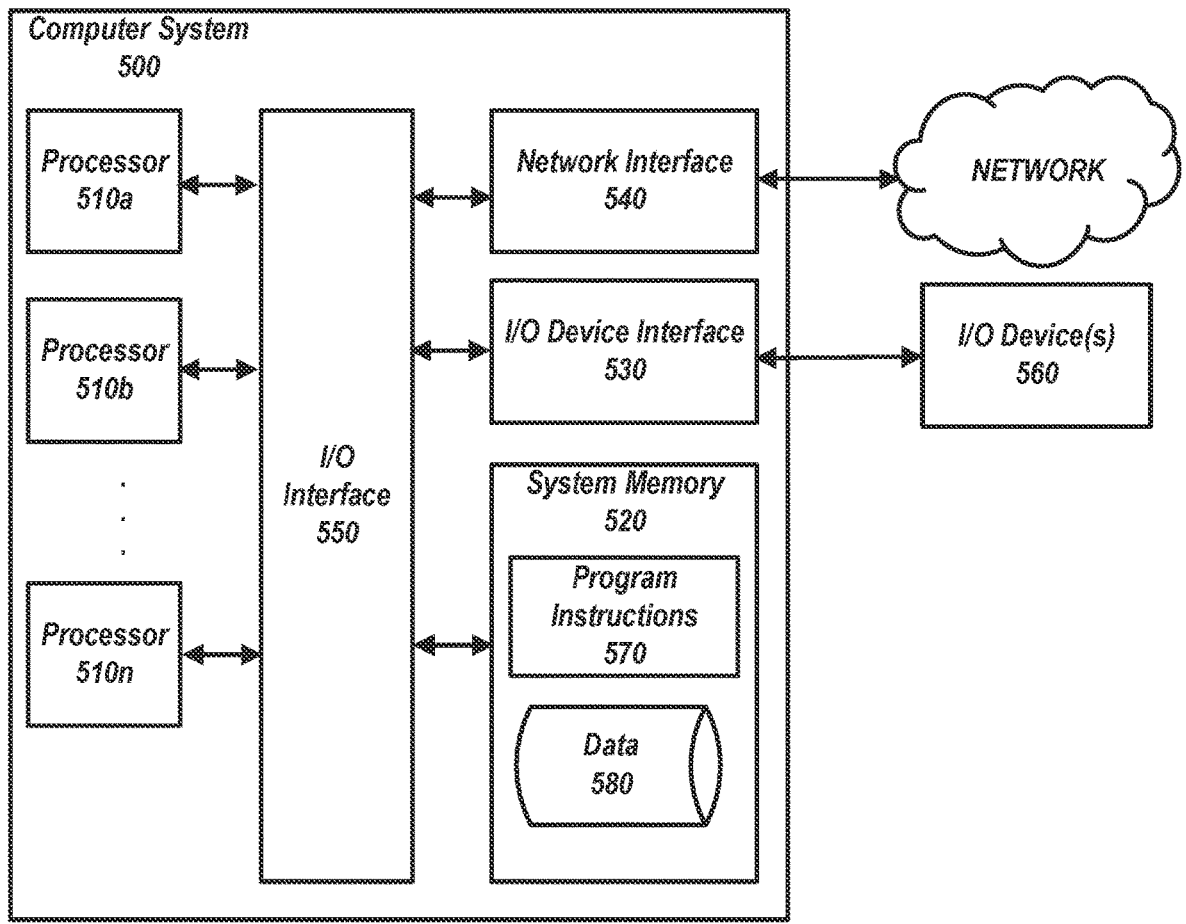
FIG. 5 shows an example computing system that may be used in accordance with one or more embodiments of this disclosure.

FIG. 5 shows an example computing system that may be used in accordance with some embodiments of this disclosure. Specifically, effect detection system 102, data node 104 and/or computing devices 108a-108n may use one or more of the components described below. In some instances, computing system 500 is referred to as a computer system. A person skilled in the art would understand that those terms may be used interchangeably. The components of FIG. 5 may be used to perform some or all operations discussed in relation with FIGS. 1-4. Furthermore, various portions of the systems and methods described herein may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an input/output I/O device interface 530, and a network interface 540 via an input/output (I/O) interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a uni-processor system including one processor (e.g., processor 510$a$), or a multi-processor system including any number of suitable processors (e.g., 510$a$-510$n$). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer systems, for example, may be connected to computer system 500 via a network using network interface 540.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 570 or data 580. Program instructions 570 may be executable by a processor (e.g., one or more of processors 510$a$-510$n$) to implement one or more embodiments of the present techniques. Program instructions 570 may include modules of computer program instructions for implementing one or more techniques described herein with regard to various processing modules. Program instructions 570 may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 520 may include a non-transitory computer readable storage medium that may have program instructions stored thereon that are executable by a computer processor (e.g., one or more of processors 510$a$-510$n$) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510$a$-510$n$, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510$a$-510$n$). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500, or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 500 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Computing Operation Flow

FIG. 6 is a flowchart of operations for a mechanism for determining performance changes attributed to conditions affecting datasets. The operations of FIG. 6 may use components described in relation to FIG. 5 and may be performed on machine learning models described in FIG. 4. At 602, effect detection system 102 inputs, into a first machine learning model, a first plurality of features of a first dataset to obtain a set of predictions for a target variable. Effect detection system 102 may perform the input operation using an API. The first machine learning model may be hosted on effect detection system 102 or data node 104. When the first machine learning model is hosted on data node 104, effect detection system 102 may use network interface 540 to perform the input operation over network 550.

At 604, effect detection system 102 generates an updated first dataset having the set of predictions assigned to the target variable. Effect detection system 102 may use one or more processors 510a-510n to perform the input operation (s) via an API associated with the first machine learning model. At 606, effect detection system 102 retrieves a second dataset that includes a second set of results corresponding to the target variable. Effect detection system 102 may use one or more processors 510a-510n to perform the retrieving operation. The second dataset may be stored in system memory 520 and or on data node 104. Thus, effect detection system may perform the retrieval operation from system memory 520 or using network interface 540 over network 150.

At 608, effect detection system 102 inputs, into a second machine learning model, the updated first dataset and the second dataset. Effect detection system 102 may perform the input operation using an API. The second machine learning model may be hosted on effect detection system 102 or data node 104. When the second machine learning model is hosted on data node 104, effect detection system 102 may use network interface 540 to perform the input operation over network 550.

At 610, effect detection system 102 inputs, into the second machine learning model, the first dataset and the second dataset. Effect detection system 102 may perform the input operation using an API. The second machine learning model may be hosted on effect detection system 102 or data node 104. When the second machine learning model is hosted on data node 104, effect detection system 102 may use network interface 540 to perform the input operation over network 550.

At 612, effect detection system 102 determines a performance change based on the actual performance shift value and the synthetic performance shift value. For example, effect detection system 102 may make the determination using processors 510a-510n and store the performance change value in system memory 520. Effect detection system 102 may transmit the performance change value (e.g., using network interface 540) through network 150 to, for example, one or more computing devices 108a-108n.

The techniques for detecting model bias using residual values of two datasets (e.g., a training dataset and a compare dataset) to compare residuals for specific categories of data will be better understood with reference to the following enumerated embodiments:

1. A method comprising: inputting, into a first machine learning model, a first plurality of features of a first dataset to obtain a set of predictions for a target variable, wherein the first machine learning model was trained to output a prediction for the target variable based on features of a training dataset, and wherein the first plurality of features matches at least some features of the training dataset; generating an updated first dataset having the set of predictions assigned to the target variable instead of a first set of results; retrieving a second dataset that includes a second set of results corresponding to the target variable, wherein the second set of results resulted from applying a condition affecting one or more features of the second dataset; inputting, into a second machine learning model, (1) the updated first dataset including the set of predictions and (2) the second dataset including the second set of results to obtain a synthetic performance shift value between the first dataset and the second dataset; inputting, into the second machine learning model, the first dataset including the first set of results and the second dataset including the second set of results, to obtain an actual performance shift value between the first dataset and the second dataset; and determining a performance change between the first dataset and the second dataset attributed to the condition based on the actual performance shift value and the synthetic performance shift value.

2. Any of the proceeding embodiments, further comprising: retrieving the training dataset, wherein the training dataset comprises a plurality of predictors corresponding to a plurality of characteristics of a first group and a second group, wherein the first group corresponds to a first population and the second group corresponds to a second population, and wherein the first population shares a first characteristic, and the second population shares a second characteristic; and training, the first machine learning model using the training dataset to output predictions for the target variable.

3. Any of the proceeding embodiments, wherein determining the performance change between the first dataset and the second dataset attributed to the condition comprises generating a residual value based on the actual performance shift value and the synthetic performance shift value.

4. Any of the proceeding embodiments, further comprising: receiving from the second machine learning model the actual performance shift value; and receiving from the second machine learning model the synthetic performance shift value.

5. Any of the proceeding embodiments, wherein determining the performance change between the first dataset and the second dataset comprises subtracting, from the actual performance shift value, the synthetic performance shift value.

6. Any of the proceeding embodiments, wherein inputting, into the first machine learning model, the first dataset to obtain the set of predictions comprises receiving, from the first machine learning model, a corresponding probability for each entry in the first dataset.

7. Any of the proceeding embodiments, wherein generating the updated first dataset comprises replacing, for each entry in the first dataset, the target variable with the corresponding probability received from the first machine learning model.

8. Any of the proceeding embodiments, further comprising causing a display on a display screen of the performance change between the first dataset and the second dataset attributed to the condition based on the actual performance shift value.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

Although the present invention has been described in detail for the purpose of illustration based on what is currently considered to be the most practical and preferred embodiments, it is to be understood that such detail is solely for that purpose, and that the invention is not limited to the disclosed embodiments, but on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

What is claimed is:

1. A system for determining a feature impact on machine learning model predictions, the system comprising:

one or more processors; and a non-transitory computer-readable storage medium storing instructions, which when executed by the one or more processors cause the one or more processors to:

retrieve a base dataset, wherein the base dataset comprises a plurality of predictors corresponding to a plurality of characteristics of a first group and of a second group, wherein the first group corresponds to a first population and the second group corresponds to a second population, and wherein the first population shares a first characteristic, and the second population shares a second characteristic;

train a first machine learning model using the base dataset, wherein the first machine learning model outputs a prediction for a target variable based on inputted predictors and a probability of the prediction for the target variable being correct;

retrieve a control dataset wherein the control dataset includes a first set of results corresponding to the target variable, and wherein the control dataset includes the plurality of characteristics of a third group corresponding to the first population;

input, into the first machine learning model, the control dataset to obtain a first set of predictions and a first set of probabilities, wherein the first set of predictions corresponds to the target variable and the first set of probabilities corresponds to the first set of predictions;

generate, based on obtaining the first set of predictions and the first set of probabilities by inputting the control dataset into the first machine learning model, an updated control dataset by adding a new column containing the first set of probabilities, the updated control dataset having the first set of predictions assigned to the target variable instead of the first set of results and the first set of probabilities assigned to a corresponding prediction of the first set of predictions;

retrieve a test dataset that includes a second set of results corresponding to the target variable, wherein the second set of results resulted from applying a condition to a fourth group, wherein the test dataset includes the plurality of characteristics for the fourth group, and wherein the fourth group corresponds to the second population;

input, into a second machine learning model, (1) the updated control dataset, with the first set of probabilities, and the test dataset to obtain a synthetic performance shift value between the test dataset and the control dataset, and (2) the control dataset and the test dataset to obtain an actual performance shift value between the test dataset and the control dataset;

generate a residual value based on the actual performance shift value and the synthetic performance shift value; and determine a performance change of the fourth group attributed to the condition based on the residual value.

2. The system of claim 1, wherein the instructions for determining the performance change of the fourth group attributed to the condition, when executed by the one or more processors, further cause the one or more processors to subtract, from the actual performance shift value, the synthetic performance shift value.

3. The system of claim 1, wherein the instructions for inputting into the first machine learning model, the control dataset to obtain the first set of predictions, when executed by the one or more processors, further cause the one or more processors to:

receive, from the first machine learning model, a corresponding probability for each entry in the control dataset.

4. The system of claim 3, wherein the instructions for generating the updated control dataset, when executed by the one or more processors, further cause the one or more processors to:

replace, for each entry in the control dataset, the target variable with the corresponding probability received from the first machine learning model.

5. A method comprising:

inputting, into a first machine learning model, a first plurality of features of a first dataset to obtain a set of predictions for a target variable and a set of probabilities corresponding with the set of predictions, wherein the first machine learning model was trained to output i) a prediction for the target variable based on features of a training dataset and ii) a probability of the prediction for the target variable being correct, and wherein the first plurality of features matches at least some features of the training dataset;

generating, based on obtaining the set of predictions and the set of probabilities by inputting the first plurality of features into the first machine learning model, an updated first dataset having the set of predictions assigned to the target variable instead of a first set of results, the set of probabilities assigned to a corresponding prediction of the set of predictions;

retrieving a second dataset that includes a second set of results corresponding to the target variable, wherein the second set of results resulted from applying a condition affecting one or more features of the second dataset;

inputting, into a second machine learning model, (1) the updated first dataset having the set of predictions and the set of probabilities and (2) the second dataset including the second set of results to obtain a synthetic performance shift value between the first dataset and the second dataset;

inputting, into the second machine learning model, the first dataset including the first set of results and the second dataset including the second set of results, to obtain an actual performance shift value between the first dataset and the second dataset;

generating a residual value based on the actual performance shift value, and the synthetic performance shift value; and determining a performance change between the first dataset and the second dataset attributed to the condition based on the residual value.

6. The method of claim 5, further comprising:

retrieving the training dataset, wherein the training dataset comprises a plurality of predictors corresponding to a plurality of characteristics of a first group and a second group, wherein the first group corresponds to a first population and the second group corresponds to a second population, and wherein the first population shares a first characteristic, and the second population shares a second characteristic; and training, the first machine learning model using the training dataset to output predictions for the target variable.

7. The method of claim 5, further comprising:

receiving from the second machine learning model the actual performance shift value; and receiving from the second machine learning model the synthetic performance shift value.

8. The method of claim 5, wherein determining the performance change between the first dataset and the second dataset comprises subtracting, from the actual performance shift value, the synthetic performance shift value.

9. The method of claim 5, further comprising causing a display on a display screen of the performance change between the first dataset and the second dataset attributed to the condition based on the actual performance shift value.

10. A non-transitory, computer-readable medium storing instructions for determining performance changes attributed to conditions affecting datasets, the instructions when executed by one or more processors, cause the one or more processors to perform operations comprising:

inputting, into a first machine learning model, a first plurality of features of a first dataset to obtain a set of predictions for a target variable and a set of probabilities corresponding with the set of predictions, wherein the first machine learning model was trained to output i) a prediction for the target variable based on features of a training dataset and ii) a probability of the prediction for the target variable being correct, and wherein the first plurality of features matches at least some features of the training dataset;

generating, based on obtaining the set of predictions and the set of probabilities by inputting the first plurality of features into the first machine learning model, an updated first dataset by adding a new column containing the set of probabilities, the updated first dataset having the set of predictions assigned to the target variable instead of a first set of results and the set of probabilities assigned to a corresponding prediction of the set of predictions;

retrieving a second dataset that includes a second set of results corresponding to the target variable, wherein the second set of results resulted from applying a condition affecting one or more features of the second dataset;

inputting, into a second machine learning model, (1) the updated first dataset having the set of predictions and the set of probabilities and (2) the second dataset including the second set of results to obtain a synthetic performance shift value between the first dataset and the second dataset;

inputting, into the second machine learning model, the first dataset including the first set of results and the second dataset including the second set of results, to obtain an actual performance shift value between the first dataset and the second dataset;

generating a residual value based on the actual performance shift value, and the synthetic performance shift value; and determining a performance change between the first dataset and the second dataset attributed to the condition based on the residual value.

11. The non-transitory, computer-readable medium of claim 10, wherein the instructions further cause the one or more processors to perform operations comprising:

retrieving the training dataset, wherein the training dataset comprises a plurality of predictors corresponding to a plurality of characteristics of a first group and of a second group, wherein the first group corresponds to a first population and the second group corresponds to a second population, and wherein the first population shares a first characteristic, and the second population shares a second characteristic; and training, the first machine learning model using the training dataset to output predictions for the target variable.

12. The non-transitory, computer-readable medium of claim 10, wherein the instructions further cause the one or more processors to perform operations comprising:

receiving from the second machine learning model the actual performance shift value; and receiving from the second machine learning model the synthetic performance shift value.

13. The non-transitory, computer-readable medium of claim 10, wherein the instructions for determining the performance change between the first dataset and the second dataset further cause the one or more processors to perform operations comprising subtracting, from the actual performance shift value, the synthetic performance shift value.

14. The non-transitory, computer-readable medium of claim 10, the instructions further causing a display on a display screen of the performance change between the first dataset and the second dataset attributed to the condition based on the actual performance shift value.

* * * * *